Figure 1:
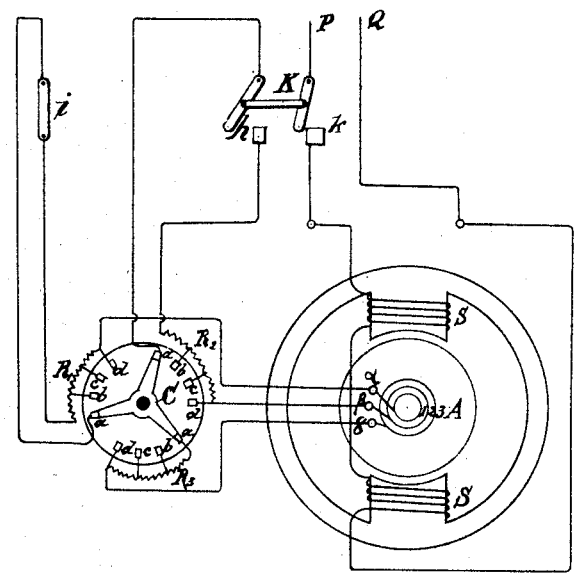

No. 631,919.  
Patented Aug. 29, 1899.

R. ARNO.
ELECTRIC MOTOR.
(Application filed Mar. 5, 1898.)

(No Model.)

Witnesses  
Inventor  
Riccardo Arno

UNITED STATES PATENT OFFICE.

RICCARDO ARNO, OF TURIN, ITALY.

ELECTRIC MOTOR.

SPECIFICATION forming part of Letters Patent No. 631,919, dated August 29, 1899.

Application filed March 5, 1898. Serial No. 672,664. (No model.)

*To all whom it may concern:*

Be it known that I, RICCARDO ARNO, a subject of the King of Italy, residing at Turin, in the Kingdom of Italy, have invented certain new and useful Improvements in Electric Motors; and I do hereby declare that the following is a full, clear, and exact description of the same.

The asynchronous monophase alternating-current motors heretofore known are started by superimposing upon the alternating field an oblique field differing in phase. Their field-magnet, or what is termed the "stator," (see *Polyphase Electric Currents*, by S. P. Thompson, 1895, page 112,) consists of two groups of coils, one of said groups—*i. e.*, the main coils—being fed by the alternating monophase current, which is to keep the motor in motion while it performs useful work. The other group of coils—the auxiliary starting-coils—receive current which only flows through them while the motor is being started, said current being out of step with that in the main coils.

The object of my invention is to dispense with the auxiliary starting-coils and provide simple and efficient means for starting and reversing the motor.

I have discovered that by inserting an additional resistance into the closed-coil armature—*i. e.*, the rotor (according to the nomenclature introduced by Prof. S. P. Thompson)—and by imparting to said rotor or armature an initial motion of very low speed, such as may be obtained by turning it by hand, asynchronous monophase motors can be started without the use of a rotating magnetic field and only one group of coils—that is, the main coils—need be fed with current. The motor thus acts as an asynchronous monophase motor during the period of starting, just as motors fitted with the starting-gears heretofore in use do after they have got up speed and the auxiliary starting-coils have been switched out. This observation has led me to construct a new asynchronous monophase motor provided with only one set of coils on the stator, the auxiliary starting-coils being dispensed with. This motor is started by inserting into the closed-coil armature (rotor) an additional resistance and an impulse given to the rotor by hand, the motor running in that direction in which the impulse was given. The said additional resistance must be capable of admitting of gradual reduction, so as to be switched out gradually and without shocks just before the motor has got up speed. Under these conditions the strength of current during the whole period of starting will at no time exceed the value it takes just as the motor begins to turn. Trials carried out on large motors of, say, one hundred horse-power and more under no load except the friction of the belt and loose pulley prove that the additional resistance that is to be inserted in the armature to cause the motor to start without auxiliary windings on the stator and when a very low speed is imparted to the rotor has a value which nearly corresponds to that required to absorb the effective current during the normal running of the motor under the same load. This condition is much more favorable than that which takes place during the starting of asynchronous monophase motors fitted with auxiliary starting-coils, which latter cause them to act as polyphase motors during starting.

Figure 2:
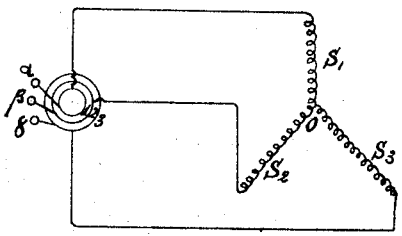

Referring to the accompanying drawings, Figure 1 is a diagrammatic view of my improved motor with starting devices attached, and Fig. 2 is a similar view of the armature (rotor) coils, brushes, and rings.

I have found that theoretically the value of the resistance to be inserted in the elementary armature-coils is $r = .414\ 2\pi n L$, wherein $n$ represents the frequency of the alternating magnetic field and $r$ and $L$ the resistance and the induction of each of the elementary armature-coils, respectively. The value of $r = 2\pi n L$ is the greatest value that $r$ can have in order to give positive values of torque corresponding to positive values of the speed for alternating-polyphase-current machines. I have found that the value of the resistance to be inserted in the rotor-coil circuits of asynchronous alternating monophase current motors practically about one-half and more exactly .414 times that maximum resistance which, if inserted in the armature of the motor considered as a polyphase machine, will just allow it to act as a motor. This maximum or critical resistance, if increased, will cause the motor-coils to have such a resistance as to cause the machine to then act as a generator instead of as a motor. This agrees with the results of my trials above referred to.

I have shown, for the purpose of illustrating my invention, in Fig. 1 a diagrammatic view of a motor having a two-pole stator, each pole having only a single coil carrying an alternating monophase current, and in Fig. 2 also a diagrammatic view, the rotor provided with a three-phase winding, the three coils electrically connected to rings on which trail brushes, these brushes being connected, as shown in Fig. 1, with a suitable resistance adapted to be gradually cut out of circuit. Thus far the device is adequate to start the motor provided a slight impulse is given to the rotor by hand, the direction of which impulse determines the direction of run.

In the practical operation of machines of this class it is objectionable to the operators to have to move the rotating part by manual force, so I have further illustrated means whereby this objection is overcome. It will be observed that I have no auxiliary winding on the stator to be used as a starting-coil.

S S is a bipolar stator supplied from the circuit P Q by a monophase alternating current. The coils of the motor closed at O are connected to the rings 1 2 3, on which trail the brushes $\alpha$ $\beta$ $\gamma$. Each of these coils $S'$ $S^2$ $S^3$ is connected through its respective ring and brush to a resistance $R'$ $R^2$ $R^3$, adapted to be cut out by turning the three-armed lever C' on the rheostat through the gradually-reducing resistances $a$ $b$ $c$ $d$. The maximum resistance which I insert is $r = 0.414 \, 2\pi n L$ or 0.414 times the greatest value that will still allow the machine to act as a motor. This resistance is such that when inserted in the rotor-coils and a small degree of rotation is given the rotor by hand the motor will be self-starting, as the circuit is gradually cut out as the motor assumes normal speed.

To obviate the necessity of starting the rotor by an impulse given it by hand, I have shown diagrammatically means whereby this can be accomplished.

$k$ is the cut-out for the main circuit. $h$ is a cut-out for one of the coils—say $S^2$—and $i$ is a cut-out for a second coil—say $S'$. It will be sufficient to say for the purposes of this invention that $k$ and $h$ are successively closed by a switch K, the particular construction and arrangement of mechanical devices employed for accomplishing this result forming no part of my invention. It is also unimportant what particular means or device is used for closing the switch $i$. The object of these devices is to render the rotor-coils unsymmetrical at the instant of starting, and this is done by having one of said coils on open circuit, which will be sufficient to cause the starting of the machine, provided it be not at a dead-point, the cut-out $i$ being in this case not used. The stopping of the machine at a dead-point can always be avoided by a judicious operator. It follows that if the motor is not at the dead-point it will only be necessary to operate the switch K, whereby the circuit is closed at $k$ and immediately afterward at $h$. The current passing to the stator first acts for a very short period on the rotor while one of its coils (shown in the drawings as $S'$) is in open circuit. This is sufficient to cause the rotor to make a partial turn to give the necessary impulse to the moving part, when the circuit in the open coil is then closed and the motor slowly started, the resistance in the three coils being then gradually cut out until normal speed is produced. This result may be greatly increased by causing the resistance in the closed coils to be comparatively small at the time when the cut-out $k$ is closed, then closing the open coil at $h$, increasing the resistance in the outer coils to a maximum, and gradually cutting out the resistance in all the coils as the motor assumes normal speed.

I will now suppose that the motor is at the dead-point and I wish to start it without giving it an impulse or partial turn by hand. For this purpose I open the switch at $i$, placing the coil $S'$ on open circuit. This will give me two coils $S'$ and $S^2$ on open circuit. Then by operating the switch K one of the active coils $S^3$ will cause the rotor to turn through a slight angle. Immediately afterward coil $S^2$ will be put in circuit and the motor will tend to assume a dead-point with regard to these two coils when the other coil is put in circuit by closing the cut-out $i$, when the motor will be started, the resistance in all the coils being then gradually cut out as the motor assumes normal speed. This process also affords a convenient means for reversing the direction of the motor, in which case it will only be necessary to provide means for breaking the circuit in the coil $S^3$ instead of in coil $S'$, and then start in the manner above described.

Having thus described my invention, what I claim as new therein, and desire to secure by Letters Patent, is—

1. A method of starting asynchronous monophase alternating-current motors, which consists in inserting a suitable resistance in the rotor-coils and momentarily rendering the coils of the rotor unsymmetrical and gradually cutting out the resistance, substantially as and for the purpose set forth.

2. A method of starting asynchronous monophase alternating-current motors, which consists in inserting a suitable resistance in the rotor-coils, momentarily placing one or more of the rotor-coils on open circuit and then gradually cutting out the resistance, substantially as and for the purpose set forth.

3. A method of starting asynchronous monophase alternating-current motors, which consists in inserting in the rotor-coil circuits a resistance of 0.414 times the maximum just allowing the machine to act as a motor when considered as a rotary field-motor imparting a slight impulse to the motor, and gradually cutting out such resistance, substantially as set forth.

4. A method of starting asynchronous monophase alternating-current motors, which consists in inserting a suitable resistance in the rotor-coil circuits, rendering the coils of the rotor unsymmetrical by placing some of them on open circuit, successively closing them when current is supplied to the motor, and gradually cutting out the resistances, substantially as and for the purpose set forth.

5. A method of starting asynchronous monophase alternating-current motors, which consists in inserting in the rotor-coil circuits a resistance of $r = .414 \times 2\pi nL$ giving the motor a slight impulse and gradually cutting out the resistance, substantially as and for the purpose set forth.

6. A method of starting asynchronous monophase alternating-current motors, which consists in rendering the coils of the rotor unsymmetrical by placing one or more of them in open circuit, placing a suitable resistance in the circuit of said coils, the resistance in the closed coils being comparatively small, immediately increasing the resistance in the closed coils after the current is turned on in the motor, closing the open-coil circuits and then gradually cutting out the resistance in all the coils or groups of coils, substantially as and for the purpose set forth.

In witness whereof I have hereunto set my hand in presence of two witnesses.

RICCARDO ARNO.

Witnesses:
SANTE ZIRRCO,
OTTORINO SARRAINO.